US009201567B2

(12) United States Patent
Schrauben

(10) Patent No.: US 9,201,567 B2
(45) Date of Patent: Dec. 1, 2015

(54) METHOD FOR INDICATING A CURSOR LOCATION ON A FLIGHT DECK HAVING MULTIPLE FLIGHT DISPLAYS

(75) Inventor: Andrew Thomas Schrauben, Lowell, MI (US)

(73) Assignee: General Electric Company, Schenectady, NY (US)

( * ) Notice: Subject to any disclaimer, the term of this patent is extended or adjusted under 35 U.S.C. 154(b) by 557 days.

(21) Appl. No.: 13/169,821

(22) Filed: Jun. 27, 2011

(65) Prior Publication Data

US 2012/0327104 A1    Dec. 27, 2012

(51) Int. Cl.
*G06F 3/0481* (2013.01)
*G06F 3/0489* (2013.01)

(52) U.S. Cl.
CPC ........ *G06F 3/04812* (2013.01); *G06F 3/04892* (2013.01); *G06F 2203/04801* (2013.01)

(58) Field of Classification Search
CPC ............ G06F 3/04812; G06F 3/04892; G06F 3/1423; G06F 2203/04801
USPC ....................................................... 715/856
See application file for complete search history.

(56) References Cited

U.S. PATENT DOCUMENTS

| | | | |
|---|---|---|---|
| 5,214,414 A * | 5/1993 | Levine et al. | 345/157 |
| 5,642,131 A * | 6/1997 | Pekelney et al. | 715/862 |
| 6,381,519 B1 * | 4/2002 | Snyder | 701/3 |
| 6,392,675 B1 * | 5/2002 | Becker et al. | 715/858 |
| 6,774,886 B2 * | 8/2004 | Okuda et al. | 345/157 |
| 6,784,869 B1 * | 8/2004 | Clark et al. | 345/156 |
| 7,385,584 B2 * | 6/2008 | Segre | 345/156 |
| 7,498,941 B2 * | 3/2009 | Ohishi | 340/572.1 |
| 7,724,240 B2 | 5/2010 | Gyde et al. | |
| 7,730,430 B2 * | 6/2010 | Baudisch et al. | 715/857 |
| 2002/0063740 A1 * | 5/2002 | Forlenza et al. | 345/856 |
| 2004/0113888 A1 * | 6/2004 | De Waal | 345/157 |
| 2005/0116929 A1 * | 6/2005 | Molander et al. | 345/157 |
| 2006/0143580 A1 * | 6/2006 | Gimness et al. | 715/856 |
| 2009/0284532 A1 * | 11/2009 | Kerr et al. | 345/442 |
| 2011/0006983 A1 | 1/2011 | Grothe | |
| 2011/0083108 A1 * | 4/2011 | Klein et al. | 715/859 |

OTHER PUBLICATIONS

EP Search Report issued on Aug. 25, 2015 in relation to corresponding EP application 12173107.9.

* cited by examiner

*Primary Examiner* — Alvin Tan
(74) *Attorney, Agent, or Firm* — General Electric Company; William S. Munnerlyn

(57) ABSTRACT

A method of indicating a location of a cursor on a flight deck of an aircraft having multiple flight displays includes detecting when the cursor is jumped from a first location on a first flight display of the multiple flight displays to a second location on a second flight display of the multiple flight displays and displaying a comet tail on at least one of the first flight display and the second flight display directed toward the second location in response to the detected jump.

18 Claims, 4 Drawing Sheets

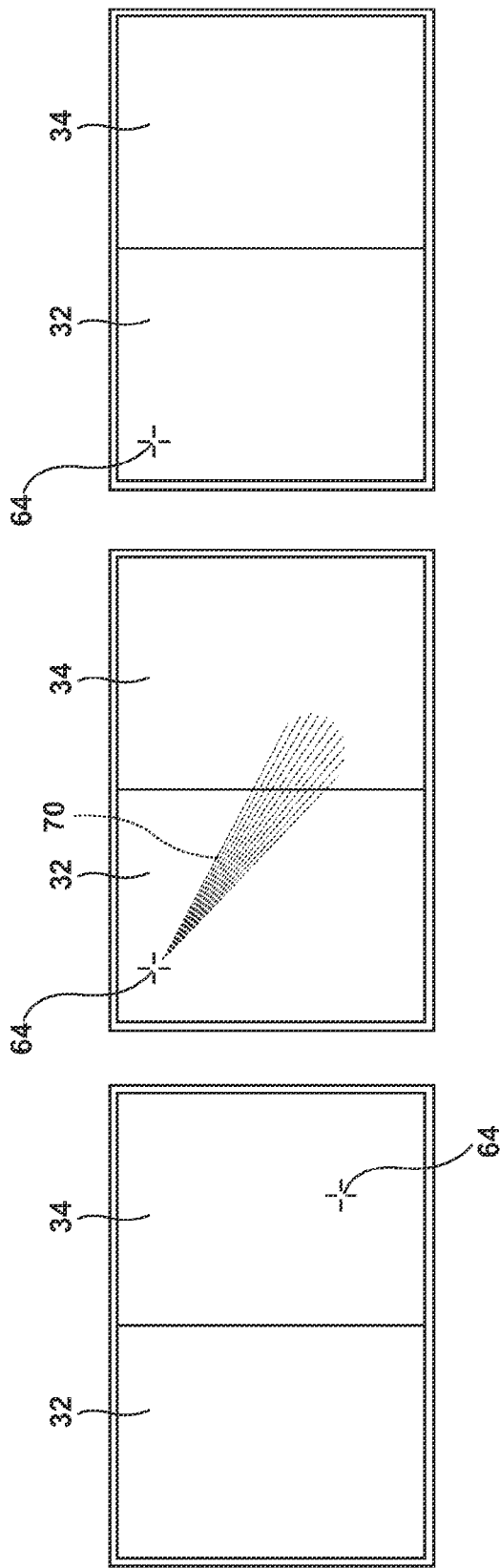

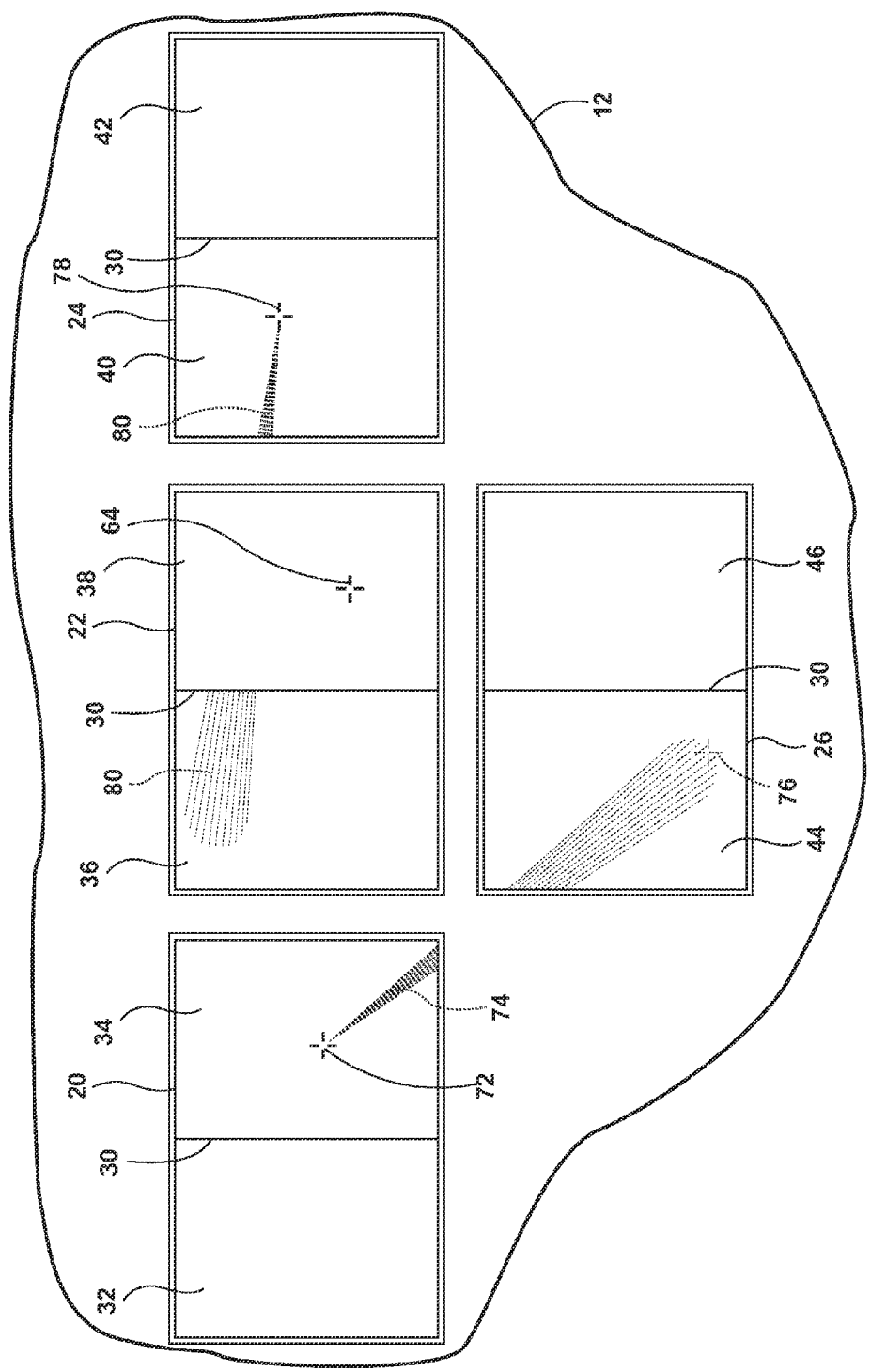

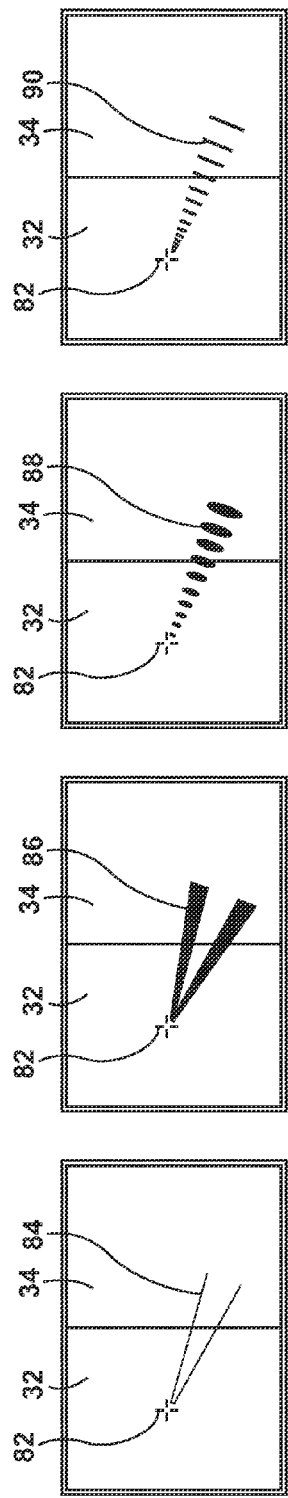
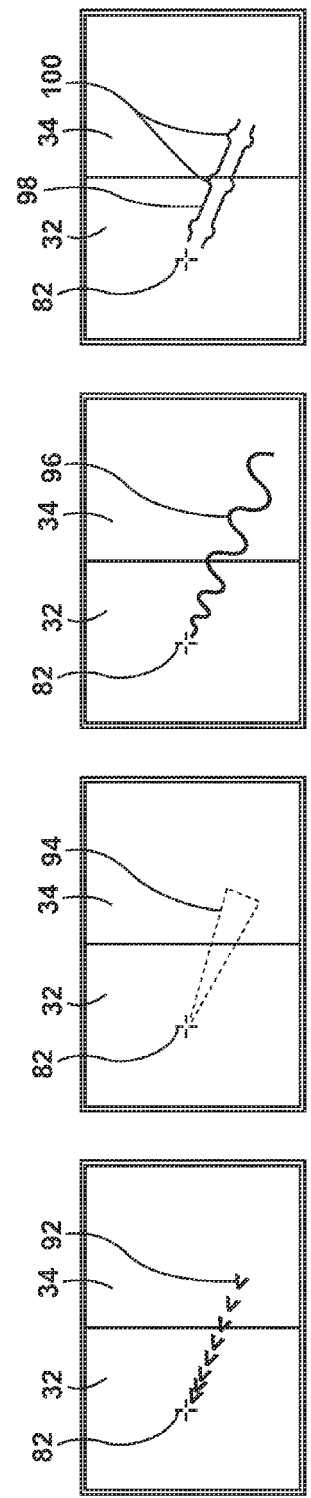

METHOD FOR INDICATING A CURSOR LOCATION ON A FLIGHT DECK HAVING MULTIPLE FLIGHT DISPLAYS

BACKGROUND OF THE INVENTION

Contemporary aircraft cockpits include a flight deck having a display and control system that the pilot and flight crew may use in the operation and control of the aircraft. The aircraft display and control system may include among other things a processor, a cursor control and selection device, a multifunction keyboard, and multiple flight displays. The pilot and flight crew may perform flight plan entry and modification by manipulating graphical and textual information on the multiple flight displays using the cursor control device and the multifunction keyboard. When a pilot commands their cursor to jump from one display to another using the cursor control device, the cursor will disappear from its old location and reappear at its new location requiring the pilot to search the expected display area in order to visually reacquire the cursor.

BRIEF DESCRIPTION OF THE INVENTION

In one embodiment, a method of indicating a location of a cursor on a flight deck of an aircraft having multiple flight displays includes detecting when the cursor is jumped from a first location on a first flight display of the multiple flight displays to a second location on a second flight display of the multiple flight displays and displaying a comet tail on at least one of the first flight display and the second flight display directed toward the second location in response to the detected jump.

BRIEF DESCRIPTION OF THE DRAWINGS

In the drawings:

FIGS. 2A-2C are sequential front views of a flight display of FIG. 1 showing movement of a cursor and the display of a comet tail in accordance with an embodiment of the present invention.

FIG. 3 is a front view of a portion of a flight deck of FIG. 1 illustrating multiple cursors and comet tails in accordance with a second embodiment of the present invention.

FIGS. 4A-4H are front views of a flight display of FIG. 1 showing exemplary images forming comet tails in accordance with additional embodiments of the invention.

DESCRIPTION OF EMBODIMENTS OF THE INVENTION

Figure 1:
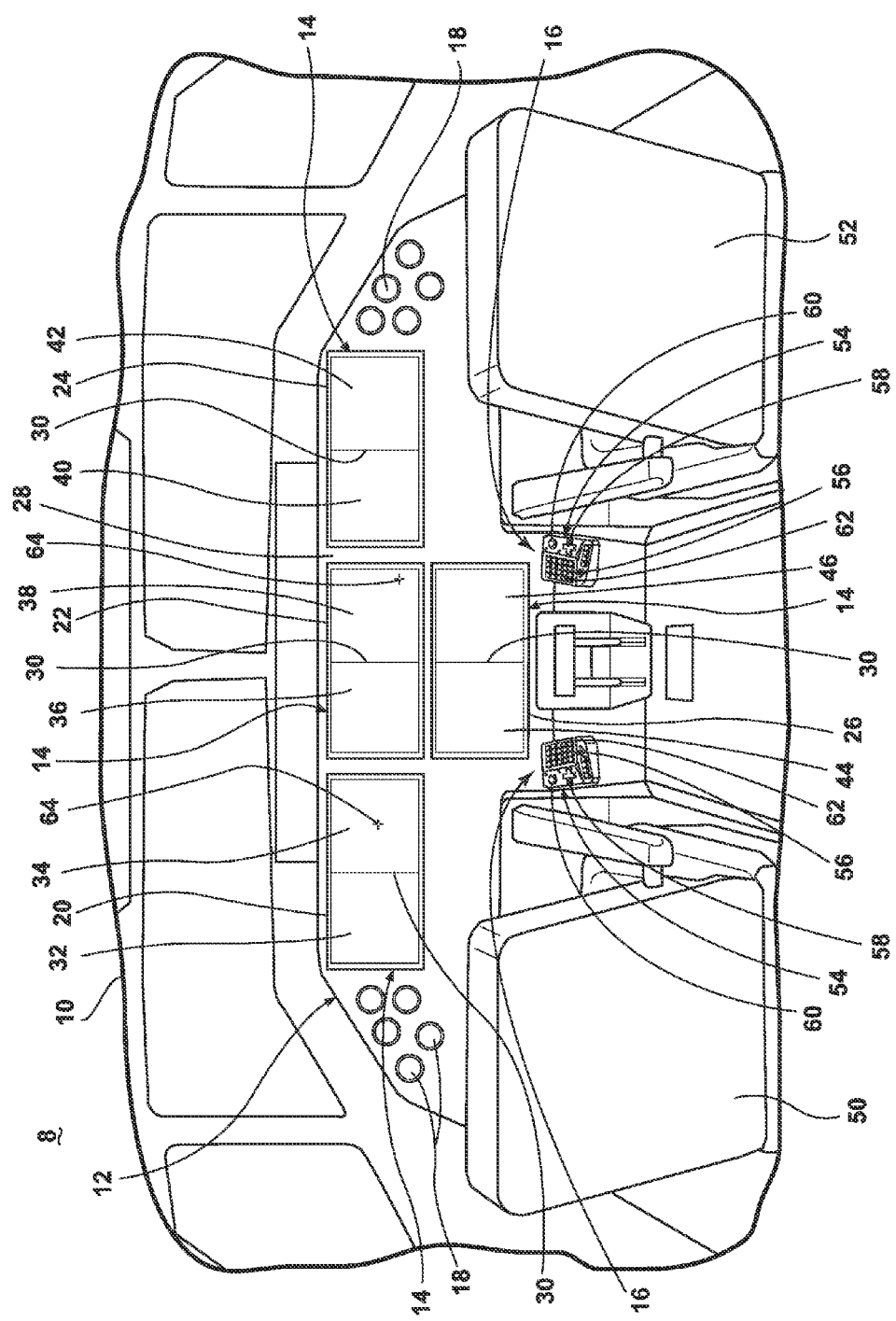
FIG. 1 is a perspective view of a portion of a prior art aircraft cockpit with a flight deck having multiple display devices in which the invention may be implemented.

FIG. 1 illustrates a portion of a prior art aircraft 8 having a cockpit 10 with a flight deck 12 having multiple flight displays 14 and a control system 16, which may be used by the pilot and flight crew to perform flight plan entry and modification by manipulating graphical and textual information on the multiple flight displays 14. The flight deck 12 may also include various instruments 18, which may be of conventional type, such as an altimeter, airspeed indicator, attitude indicator, and instrument landing system indicator.

The multiple flight displays 14 have been illustrated as including physically separate displays 20, 22, 24, and 26, which are separated by physical dividers in the form of both housings 28 around the displays 20-26 and portions of the flight deck 12. Each flight display 20-26 is illustrated as including two display devices such as, by way of non-limiting example, color flat-panel LCD screens. Each of the two display devices are separated by a virtual divider 30 located between each of the display devices in each flight display 20-26. Thus, it may be understood that the display 20 has a left display component 32 and a right display component 34, which is virtually separate from the left display component 32. Similarly, the display 22 has left and right display components 36 and 38, the display 24 has left and right display components 40 and 42, and the display 26 has left and right display components 44 and 46.

It is contemplated that the displays 20-26 may include information used by the flight crew in flying the aircraft 8. By way of non-limiting example the displays 20 and 24 may each be outboard displays which constitute Primary Flight Displays (PFD). In typical usage, display 20 and display 24 will show substantially identical information, such that the pilot and the co-pilot have access to the same information. The displays 22 and 26 may each be inboard displays and may each constitute a Multi-Function Display (MFD). The displays 22 and 26 may be used for, among other things, managing the flight plan and carrying out flight path modification.

It will be understood that a user (not shown), for example a pilot, may be present in a seat 50 at the left side of the cockpit, in front of display 20 and adjacent to display 26, while another user (not shown), for example a co-pilot, may be present at the right side of the cockpit in a seat 52, in front of display 24 and adjacent to display 26. Displays 22 and 26 may be used by more than one person. Displays 20-26 need not be coplanar and need not be the same size. Further, it is contemplated that the multiple flight displays 14 may be laid out in any manner.

One or more cursor control devices 54 and one or more multifunction keyboards 56 may be included in the control system 16 and may be used by one or more flight crew members, including the pilot and co-pilot, to provide input to a processor (not shown) through the cursor control device(s) 54, and receive visual feedback via a graphical display produced on one or more of the multiple flight displays 14. A suitable cursor control device 54 may include any device suitable to accept input from the user and to convert that input to a graphical position on any of the multiple flight displays 14. Various joysticks, multi-way rockers switches, mice, trackballs, and the like are suitable for this purpose and each user may have separate cursor control devices 54 and keyboards 56.

By way of a non-limiting example, a multi-way rocker 58 and trackball 60 have been illustrated as being portions of the cursor control device 54 and various keys and buttons 62 have been illustrated as forming the keyboards 56. Through use of the cursor control device(s) 54 and multifunction keyboard(s) 56, the pilot and co-pilot may interact with the data elements graphically and textually in accordance with feedback provided by the multiple displays 14. In this manner it will be understood that the multiple flight displays 14 may thus include one or more cursors 64 positioned in accordance with input from one or more users received via the one or more cursor control devices 54. In general, the cursors 64 may be suitably positioned by the one or more users in order to select and graphically edit data elements appearing on any of the multiple flight displays 14. The trackball 60 may be operated by a user to move a cursor 64 within a single display device or to move the cursor 64 amongst the multiple displays 14. It is contemplated that the rocker 58 may be a single control for moving the cursor 64 amongst the multiple displays 14 and may do so in multiple directions. More specifically, the rocker 58 may allow the user to move the cursor 64 up a display, down a display, left one or more multiple displays, and right one or more multiple displays as well as combinations of those movements including up-left, up-right, down-left, down-right with a single actuation of the rocker 58.

It is contemplated that both the pilot and copilot may access both of the displays 22 and 26 from each of their respective seats 50 and 52, using distinctive cursors 64. Both displays provide the same options and are synchronized by the aircraft display and control system such that, for example, when the pilot is working on, for example, an enroute, high-altitude chart on display 22, the copilot may work on the same chart on display 26, using a different range scale or type of format. The pilot and copilot can also work together on the same panel, on the same display, each one using a separate multifunction keyboard 56 and a separate cursor control device 54 to interact with the display system. It is also contemplated that only one cursor 64 may be active within a given display device or window at a time.

Access to and between the displays 20-26 may be implemented by a "cursor jump" function, which selectively permits each cursor 64 to move about each of the displays 20-26. In one example, the cursor jump function may be implemented to control movement of the cursor 64 based on a dedicated jump button or buttons, which in the illustrated example is the rocker 58. When a user operates the rocker 58 the cursor 64 may jump to another display. By way of a non-limiting example, if the left portion of the rocker 58 is selected by the user, the cursor 64 may jump to the display immediately left of the display it was previously in. By way of an additional non-limiting example, the user may select both the left and up option on the rocker 58 and the cursor 64 may move to a display that is up and left from its previous location. Alternatively, the cursor jump function may be implemented by cursor location using the trackball 60. For example, if a pilot operates the trackball 60 to move the cursor 64 to the bottom of display 22, and continues the movement of the cursor 64 downwards the cursor 64 will "jump" to display 26. The pilot may then use the cursor 64 and related buttons, knobs, and/or keys to implement any feature available on display 26. It is also contemplated that some combination of the two implementations, that is both the movement of the cursor 64 based on its location and dedicated buttons may be combined to give the user the most control.

Regardless of the manner in which the cursor 64 is jumped by the user, when a user commands the cursor 64 to jump from one display area to another, the cursor 64 will disappear from its old location and reappear at its new location. The pilot will have to search the expected display area in order to visually re-acquire their cursor 64, especially if the new location is a significant distance from the old one. It is contemplated that the jumping of the cursor 64 to another display may automatically jump the cursor 64 to the center of the second display. Alternatively, it is contemplated that the jumping of the cursor 64 may automatically jump the cursor 64 to a portion of the display. By way of non-limiting example, this may include one of the bottom-left, bottom-right, top-left, or top-right. It is also contemplated that the cursor 64 may be jumped across either the virtual divide 30 and/or the physical divide created by the housing 28 and flight deck 12. In both such instances the cursor 64 may automatically jump to a portion of the next display. These various ways of jumping the cursor 64 may make it even harder for a user to keep track of the cursor 64. For example, if the cursor 64 is jumped across the virtual divide a user may not expect the cursor 64 to then appear at the center of the second display.

The inventive method may be used in the above described aircraft 8 or any aircraft having multiple flight displays. The inventive method uses an indicator or comet tail to help guide the visual scan of the user towards the new cursor location. The term "comet tail" as used herein may be any visual indicator capable of indicating a direction of movement of the cursor 64 from its current location to the jump location and is in no way meant to be a limiting term.

FIGS. 2A-2C graphically illustrate the inventive method of indicating the location of a cursor 64 after the cursor 64 is jumped. FIG. 2A illustrates the cursor 64 on the display 34, which may be considered a first flight display. The method begins with detecting when the cursor 64 is jumped from a first location on the first flight display 34 to a second location on a second flight display 32. In FIG. 2B the cursor 64 is illustrated as having been jumped from the first flight display 34 to the upper-left of the display 32, which may be thought of as a second flight display. When it is detected that a jump of the cursor 64 has occurred, the inventive method includes displaying a comet tail 70 directed toward the second location of the cursor 64 in response to the detected jump.

As illustrated, the comet tail 70 may be displayed on both the first flight display 34 and second flight display 32 and the comet tail 70 may extend between the first location of the cursor 64, before it jumped, and the second location of the cursor, after the jump. The comet tail 70 may be located along a line extending between such first and second locations. It is contemplated that the comet tail 70 may not extend completely between the first and second locations. For example, the comet tail 70 may be displayed on the second flight display only.

After the comet tail 70 has been displayed for some increment of time it may be removed from the flight displays leaving only the cursor 64 in the display 32 as illustrated in FIG. 2C. In this manner, the comet tail 70 may be thought of as being temporarily displayed. Alternatively, it is contemplated that the comet tail 70 may be displayed until the user moves the cursor through operation of one of the cursor control devices 54 or until the user begins to enter information by way of the keyboard 56.

FIG. 3 is a front view of a portion of the flight deck 12, which is illustrated as including a cursor 64, a second cursor 72, a comet tail 74, a residual cursor marking 76, a third cursor 78, and a comet tail 80 and illustrates a second embodiment of the invention, which contemplates interaction of the multiple cursors 64, 72, and 78 on the multiple flight displays 20-26. For illustrative purposes, the cursors 64 and 72 may be understood to be used by the pilot while the third cursor 78 may be thought of as being used by the co-pilot. Such an example will be understood to be non-limiting as it is contemplated that any number of cursors may be located on the multiple flight displays 20-26 at any one time and that those cursors may be used by any of the various users in the aircraft 8.

The second cursor 72 has been illustrated as having been jumped from the flight display 44 across a portion of the flight deck 12 to a center of the flight display 34. The comet tail 74 illustrates the direction of travel of the cursor 72 to the flight display 34. It is contemplated that the residual cursor 76 may be an optional indicator that may be displayed to illustrate where the cursor 72 jumped from. Such an additional indicator may be particularly helpful where the jump is made across several screens or larger portions of the flight deck 12.

The cursor 64 may be thought of as being an active cursor, which is being used in the display 38. When the third cursor 78 is jumped from the first flight display 36 to the second flight display 40 it is also jumped over the third flight display 38 located between the two flight displays 36 and 40. It is illustrated that comet tail 80 is illustrated in both the first and second flight displays 36 and 40 but not the third flight display 38 having the active cursor 64. The comet tail 80 is not displayed in the third display 38 so as to not distract the user using the active cursor 64 or otherwise detract from the flight display 38 having the active cursor 64. It is contemplated that the comet tail may 80 may otherwise be displayed across the third flight display 38 if the cursor 64 was not present or if the cursor 64 was not active. Further, if the cursor 64 on the third display 38 was controlled by the same user as the cursor 78, which was being jumped over that display 38, then it is contemplated that the comet tail 80 may be displayed on the third display 38. Thus, it is contemplated that the comet tail may be displayed on additional flight displays the cursor may cross while being jumped.

Further, if it will be understood that the display of the above described comet tails may build upon each other. By way of non-limiting example, if a cursor is jumped from a first display to a second display and then to a third display in succession the multiple jumps may be treated as a single jump and the comet tail may be extended through all three displays. As the three displays may not be linearly aligned it is contemplated the single comet tail through the multiple displays may change directions to indicated the path of travel. Such directional changes may be illustrated as a single continuous comet tail having a smooth curve or a sharp angle. By way of a second non-limiting example, if the cursor makes the same successive jumps from the first display to the third display a separate comet tail may be shown for the first jump between the first and second display and a second comet tail may be shown for the second jump between the second display and the third display. If additional successive jumps are made additional comet tails may be displayed.

It may be understood that displaying the comet tail directed toward the second location in response to the detected jump may include displaying an image that visually indicates a direction of travel of the cursor. FIGS. 4A-4H illustrate additional examples of images, which may be displayed after a cursor 82 jumps from a first location on the flight display 34 to a second location on a flight display 32 in order to visually indicate the direction of travel of the cursor. These examples are non-limiting and are shown for illustrative purposes only as it is contemplated that any image(s) that may visually indicate the direction of travel of the cursor 82 may be used.

As illustrated in FIG. 4A when the cursor 82 is jumped, the image displayed may include a comet tail 84 in the form of a pair of lines converging towards the new location of the cursor 82. FIG. 4B illustrates a comet tail 86 in the form of two lines both having a decreasing thickness in the direction of travel of the cursor 82. FIG. 4C illustrates that the image may include a plurality of shapes 88 having decreasing sizes in the direction of travel of the cursor 82. FIG. 4D illustrates a comet tail 90 in the form of plurality of lines having both decreasing size and an increase in frequency in the direction of travel of the cursor 82. FIG. 4E illustrates a comet tail 92 in the form of a plurality of arrow heads pointed in the direction of travel of the cursor 82. The comet tail 92 also illustrates the arrow heads have an increasing frequency in the direction of travel of the cursor 82 although this need not be the case FIG. 4F illustrates a comet tail 94 in the form of a phantom shape having a decreasing thickness in the direction of travel of the cursor 82. It is contemplated that the comet tail 94 may have a variety of attributes to increase the awareness of the user as to location of the cursor 82 and the direction of travel of the cursor 82. For example, the comet tail 94 may have one of a decreasing transparency in the direction of travel, an increasing brightness in the direction of travel, a variation in color in the direction of travel, or any combination thereof. It is also contemplated that comet tails having multiple shapes and lines may also exhibit such features. FIG. 4G illustrates a comet tail 96 in the form of a wave having decreasing amplitudes in the direction of travel of the cursor 82. It is contemplated that alternative comet tails may include an image having some pattern, which is not a wave and has either a decreasing amplitude in the direction of travel or an increasing frequency in the direction of travel.

There may also be a multitude of ways to display the images forming the various comet tails. By way of non-limiting examples, it is contemplated that the display of the image, which visually indicates the direction of travel of the cursor, may occur in a variety of manners in order to draw the attention of the user. By way of non-limiting examples, it is contemplated that the complete image forming the comet tail may be displayed all at once, that portions of the image may be sequentially displayed, or that portions of the image may be sequentially removed. It is further contemplated, that the comet tail may be only temporarily displayed so as to aid the user in finding the cursor and then not hinder the view of the user. It is further contemplated that displaying the image may also include flashing the displayed image, fading out all or a portion of the displayed image, fading in all or a portion of the displayed image, and varying the image or propagating one or more variations or portions of the image in the direction of travel. For example, FIG. 4H illustrates a comet tail 98 in the form of two parallel lines having various projections 100. It is contemplated that the projections 100 may be moved along or propagated along the comet tail 98 in the direction of travel of the cursor 82.

The above described inventive embodiments provide means for a user to visually track the sudden relocation of a cursor when the cursor is jumped from one display to another. The described embodiments help guide the visual scan of the user toward the new cursor location and requires less searching by the user to visually reacquire the cursor. This allows the user to find the cursor more quickly and focus on other aspects of flying the plane instead of spending time searching for the jumped cursor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of indicating a location of a cursor on a flight deck of an aircraft having multiple flight displays, the method comprising:

detecting when the cursor is jumped from a first location on a first flight display of the multiple flight displays to a second location on a second flight display of the multiple flight displays, wherein the cursor is jumped over a third flight display located between the first and second flight displays;

displaying a comet tail extending along at least a portion of a line extending between the first and second locations, in response to the detected jump, wherein the comet tail defines a non-cursor visual convergence along the at least a portion of the line extending between the first and second locations and wherein the comet tail is not displayed across the third flight display when the third flight display contains a second cursor of a second pilot; and maintaining the comet tail display until the cursor is moved via a cursor control device.

2. The method of claim 1 wherein the comet tail is displayed on both the first flight display and the second flight display.

3. The method of claim 2 wherein the comet tail extends between the first location and the second location.

4. The method of claim 3 wherein the comet tail is temporarily displayed.

5. The method of claim 1 wherein the comet tail is located along an entire line extending between the first and second locations.

6. The method of claim 1 wherein the second location is in the center of the second display.

7. The method of claim 1 wherein at least two of the multiple flight displays are a single physical display with a virtual divider and the cursor is jumped across the virtual divider.

8. The method of claim 1 wherein at least two of the multiple flight displays are separate physical displays with a physical divider and the cursor is jumped across the physical divider.

9. The method of claim 1 wherein the displaying of the comet tail comprises displaying an image that visually indicates direction of travel of the cursor.

10. The method of claim 9 wherein the image comprises at least one of:
 a) a line and a shape having a decreasing thickness in the direction of travel;
 b) a plurality of arrow heads;
 c) a plurality of lines;
 d) a plurality of shapes;
 e) a line and a shape having a decreasing transparency in the direction of travel;
 f) a line and a shape having an increasing brightness in the direction of travel;
 g) a line and a shape having a variation in color in the direction of travel;
 h) a wave and a pattern of decreasing amplitude in the direction of travel; or
 i) a wave and pattern of increasing frequency in the direction of travel.

11. The method of claim 9 wherein the display of the image comprises at least one of:
 a) displaying the complete image all at once;
 b) sequentially displaying portions of the image; or
 c) sequentially removing portions of the image.

12. The method of claim 11 wherein displaying the image further comprises at least one of:
 a) flashing the displayed image;
 b) fading out the displayed image;
 c) fading in the displayed image; or
 d) varying the displayed image in the direction of travel.

13. The method of claim 1 wherein the comet tail visually differs along its length to indicate a direction of movement of the cursor.

14. A method of indicating a location of a cursor on a flight deck of an aircraft having a set of flight displays, comprising:
 determining that a first cursor of a first user jumped from a first location on a first flight display included in a set of flight displays to a second location on a second flight display included in the set of flight displays;
 determining a third flight display included in the set of flight displays is included in a path from the first location to the second location; and
 displaying a comet tail on the first display and second display extending from the first location to the second location, and not displaying the comet tail on the third display when the third display includes a second cursor of a second user.

15. The method of claim 14, wherein the displaying the comet tail includes maintaining the comet tail until the cursor is moved via a cursor control device.

16. The method of claim 14, wherein the displaying of the comet tail comprises displaying an image that visually indicates direction of travel of the cursor.

17. The method of claim 16, wherein the image comprises at least one of: a line and a shape having a decreasing thickness in the direction of travel, a plurality of arrow heads, a plurality of lines, a plurality of shapes, a line and a shape having a decreasing transparency in the direction of travel, a line and a shape having an increasing brightness in the direction of travel, a line and a shape having a variation in color in the direction of travel, a wave and a pattern of decreasing amplitude in the direction of travel, or a wave and pattern of increasing frequency in the direction of travel.

18. The method of claim 16, wherein the display of the image comprises at least one of displaying the complete image all at once, sequentially displaying portions of the image, and sequentially removing portions of the image.

* * * * *